US009256990B2

(12) United States Patent
Meisels et al.

(10) Patent No.: US 9,256,990 B2
(45) Date of Patent: Feb. 9, 2016

(54) APPARATUS FOR DETECTING INADEQUATE MAINTENANCE OF A SYSTEM

(75) Inventors: David Benjamin Meisels, Montreal (CA); Peter Andrew Boyd, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 24 days.

(21) Appl. No.: 12/872,283

(22) Filed: Aug. 31, 2010

(65) Prior Publication Data

US 2012/0053777 A1 Mar. 1, 2012

(51) Int. Cl.

| | |
|---|---|
| ***G01M 17/00*** | (2006.01) |
| ***G06F 7/00*** | (2006.01) |
| ***G06F 11/30*** | (2006.01) |
| ***G06F 19/00*** | (2011.01) |
| ***G07C 5/00*** | (2006.01) |

(52) U.S. Cl.
CPC .................................... *G07C 5/006* (2013.01)

(58) Field of Classification Search
None
See application file for complete search history.

(56) References Cited

U.S. PATENT DOCUMENTS

| | | | | |
|---|---|---|---|---|
| 4,037,782 | A | 7/1977 | Jackson | |
| 4,817,040 | A | 3/1989 | Bodley-Scott | |
| 5,018,069 | A | 5/1991 | Pettigrew | |
| 5,617,039 | A | 4/1997 | Kuck et al. | |
| 5,809,771 | A | 9/1998 | Wernberg | |
| 6,408,259 | B1 | 6/2002 | Goebel et al. | |
| 6,915,189 | B2 | 7/2005 | Igloi et al. | |
| 7,016,771 | B2 | 3/2006 | Watkins et al. | |
| 7,235,027 | B2 | 6/2007 | Lee | |
| 2003/0095038 | A1* | 5/2003 | Dix | G07C 5/008 340/425.5 |
| 2003/0154935 | A1 | 8/2003 | Groves | |
| 2005/0096873 | A1* | 5/2005 | Klein | G01H 1/006 702/184 |
| 2006/0047378 | A1* | 3/2006 | Betters | G01C 23/005 701/3 |
| 2008/0147264 | A1* | 6/2008 | Doulatshahi | G06Q 10/06 701/29.5 |
| 2009/0138141 | A1* | 5/2009 | Nwadiogbu | G07C 5/085 701/3 |
| 2010/0073197 | A1* | 3/2010 | Eagleton | G07C 5/008 340/945 |
| 2011/0108062 | A1* | 5/2011 | Stone | B08B 3/02 134/10 |

FOREIGN PATENT DOCUMENTS

| | | |
|---|---|---|
| JP | 4368259 | 12/1992 |
| JP | 6241578 | 8/1994 |

OTHER PUBLICATIONS

"Ultra high-tech monitoring", Mar. 1998 Issue; Aircraft Maintenance Technology; Napert; http://www.amtonline.com/publication/article.jsp?publd=1&id=763&pageNum=1.
"Development of a maintenance tool used for cold preservation of removed complete engines stores in an engine shipping stand, regarding simple handling and minimizing timely aspects"; Lauber et al; Master Thesis, Departament of Fluid Mechanics, Polytechnic University of Catalonia, Catalonia, Spain; 2009.

* cited by examiner

*Primary Examiner* — Imran Mustafa
(74) *Attorney, Agent, or Firm* — Norton Rose Fulbright Canada LLP

(57) ABSTRACT

Apparatus 10 for detecting inadequate maintenance of a system 12 of an aircraft or other vehicle is provided. The apparatus comprises: computer readable medium or media 14 configured to store data 18 relating to operation or non-operation of the system 12 over a period of time; and a data processing unit 16 configured to evaluate the data to identify at least one event indicative of the inadequate maintenance of the system.

18 Claims, 2 Drawing Sheets

APPARATUS FOR DETECTING INADEQUATE MAINTENANCE OF A SYSTEM

TECHNICAL FIELD

The disclosure relates generally to systems maintenance, and more particularly to systems and methods for the detection of inadequate maintenance of aircraft systems, including engines.

BACKGROUND OF THE ART

Devices and methods for performance- and health-monitoring of many types of systems are known. Such devices usually monitor a system by collecting data during the operation of the system and reporting the data to an operator of the system. Some devices evaluate such operational data to detect trends in the performance of the system and/or monitor "vital signs" of the system while the systems are operating, and report any abnormal conditions or trends to the operator.

The execution of periodic and preventative maintenance procedures is crucial to the proper operation of aircraft systems and to the long term health of such systems. The incorrect execution, or omission, of such procedures may cause premature wear and lead to system failures, particularly where, for example, such systems sit idle for relatively long periods of time. Conventional health monitoring systems and methods may detect the consequences of inadequate maintenance only by monitoring degradation or failure in system performance. Since inadequate maintenance may not have an immediate, noticeable effect on the performance or vital signs of the system, and since regular or protracted idle periods may not be monitored, or may otherwise go undetected, the effects of inadequate maintenance on a system may only be detected long after the fact. Hence, by the time any sign can be detected, inadequate maintenance of a system may have already led to costly consequences.

Improvement in detection of inadequate maintenance, and including for example periodic maintenance, is therefore desirable.

SUMMARY

In various aspects, the disclosure provides methods, systems, and machine-executable instruction sets, and articles of manufacture comprising such instruction sets, for detecting inadequate maintenance of systems, including for example aircraft and other vehicle systems such as engines. Various embodiments of such systems, methods and instruction sets may be implemented to, for example, cause one or more data processors to, using signals representing data generated by one or more sensors associated with at least one system of an aircraft, generate data representing one or more operational events associated with the at least one aircraft system. Data represented by the sensors can, for example, represent one or more operating parameters associated with the at least one aircraft system. The processor(s) then access data representing one or more scheduled maintenance events associated with the at least one aircraft system and, based at least partly on a comparison of the generated data representing one or more operational events associated with the at least one aircraft system with the accessed data representing one or more scheduled maintenance events, determine that an inadequate maintenance condition exists. Thereafter, for example, the processor(s) can generate one or more signals indicative of the inadequate maintenance condition and store the one or more signals indicative of the inadequate maintenance condition in computer-readable memory, for later use or reference in any of a wide variety of activities.

Processors suitable for use in implementing such aspects of the disclosure can be of any suitable type. They may, for example, include single or multiple special-purpose or general purpose data or other signal processors.

Machine-interpretable instructions may be encoded as software using, for example, any suitably-configurable, known programming language; and/or they may be hard wired using special-purpose circuit boards.

Sensors used in gathering data to be processed may likewise be of any suitable known or specially-developed type. They may be useful, for example, in sensing and generating signals representing temperatures, pressures, rotational speeds, flow rates, or various forms of forces.

Memory(ies) suitable for use in implementing the various aspects of the invention may include any volatile and/or persistent electromagnetic data storage devices, including read-only, read/write, or other memories, buffers, databases, etc.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION OF THE PREFERRED EMBODIMENTS

Various aspects and embodiments of systems, methods, and other aspects of the disclosure are described through reference to the drawings.

Figure 1:
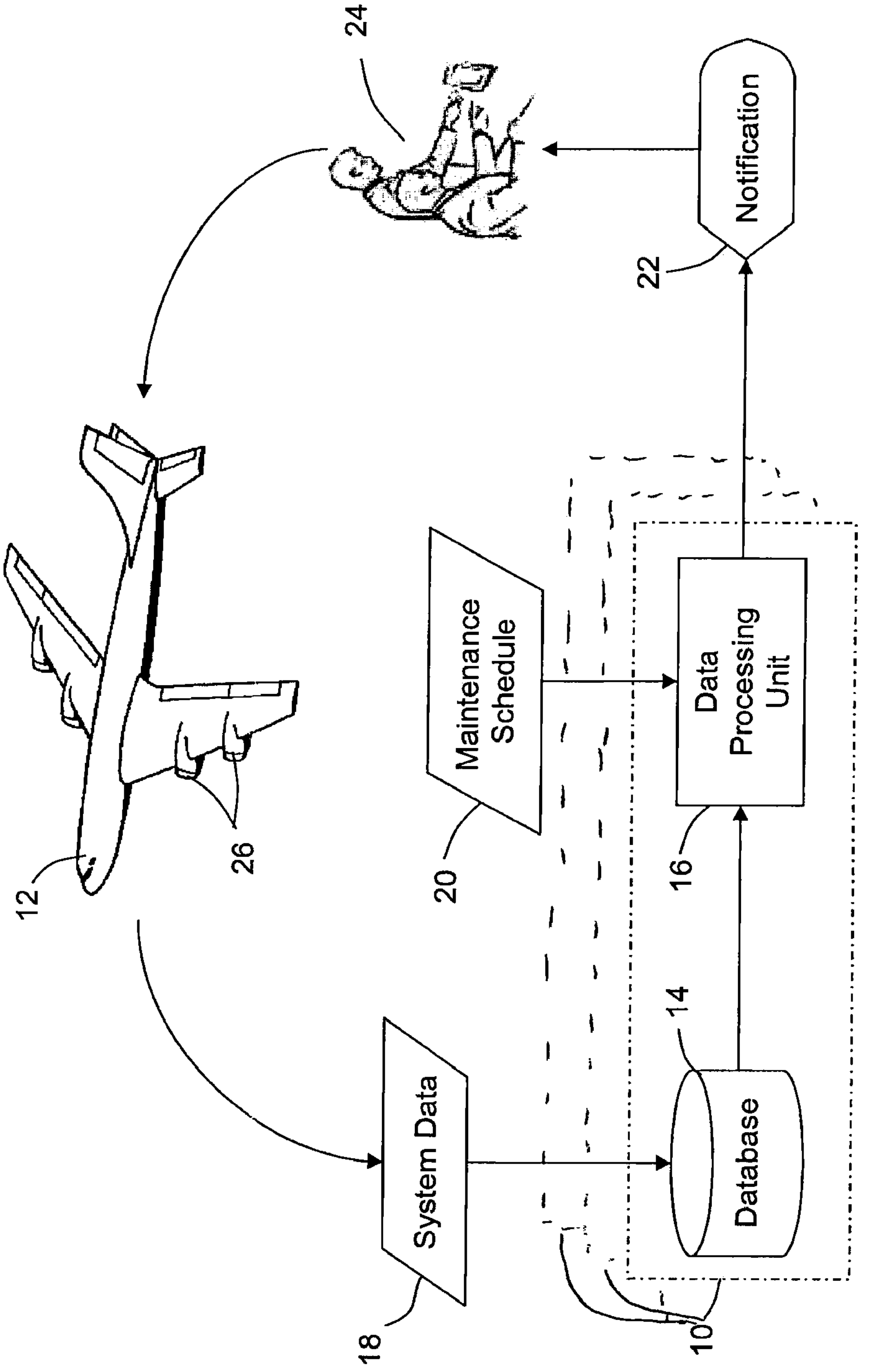
FIG. 1 is a schematic block diagram of an apparatus suitable for use in detecting inadequate maintenance of a system in accordance with the disclosure.

FIG. 1 illustrates an apparatus 10 suitable for use in detecting inadequate maintenance of one or more systems and/or subsystems 12, such as one or more engines and/or other systems or subsystems of an aircraft, in accordance with the disclosure. An apparatus 10 may for example comprise one or more databases 14 and data processing units 16. One or more database(s) 14 may store data 18 representing operation and/or idle periods for corresponding system(s) and/or subsystem(s) 12 which has been sensed over one or more periods of time. Database(s) 14 may for example comprise data stored in electronic form on suitable computer-readable media accessible by processing unit(s) 16. Processing unit(s) 16 may additionally, or alternatively, be configured to access data 20 relating to one or more recommended maintenance schedules pertaining to the monitored system(s) and/or subsystem(s).

For purposes of this disclosure, the terms "system(s)" and "subsystem(s)" are synonymous, and are used interchangeably unless otherwise clearly indicated or required by context.

Processing unit(s) 16 may be configured, for example through the use of suitably-configured machine-readable software and/or firmware instruction sets, to search database(s) 14 for relevant system data 18 and, based on comparison to data 20 representing recommended maintenance schedule(s) and/or other maintenance information, detect one or more signs of inadequate maintenance having been performed on one or more system(s) 12, 26. Processing unit(s) 16 may be configured to generate one or more signal(s) representative of notification(s) 22 to be provided to interested party(ies) 24 upon detection of inadequate maintenance, and to cause such generated signals to be provided to such interested party(ies).

Examples of aircraft systems 12, 26 with which apparatus 10 may be used include one or more engine(s) 26 of aircraft 12, and their various components and/or subsystems. Engine(s) 26 may for example include one or more gas turbine engines. However, other aircraft systems can also and/or alternatively be monitored with apparatus 10 and may also benefit from the detection of inadequate maintenance. For example, such aircraft systems may include undercarriage(s), auxiliary power unit(s), flight control surface actuation system(s), electrical system(s) and/or pressurization system(s). Systems, methods, and instruction sets according to the disclosure can be applied with particular advantage to any system(s), including many avionics systems, that 1) provide data when operated, and 2) need maintenance which requires the system to be powered up or operated to do the maintenance correctly.

It is to be noted that, as shown in FIG. 1, a single or multiple systems 10 may be used to monitor multiple systems 12, 26 (e.g., each of four engines of an aircraft), and that an aircraft or other system 12, 26 may include or otherwise communicate with any one or more systems 10 for monitoring maintenance and performance of system(s) 12, 26.

System(s) data 18 may be collected during the operation of system(s) 12, 26 and/or during periods of inactivity of such system(s) via appropriate sensor(s) associated with the system(s) and according to conventional or specially-developed methods. Where for example a system 12 includes one or more engine subsystem(s) 26, system(s) data 18 may include parameters typically recorded at a pre-determined frequency over a period of time for conventional health and performance monitoring of engine(s) 26. For example, typical parameters recorded for a gas turbine engine may include instantaneous and/or integrated fuel flow(s), gas generator speed (Ng), engine torque, inter-turbine temperature (ITT), ambient air conditions, anti-ice vane position, date, geographic position, time and others. System(s) data 18 relating to engine(s) 26 may for example be collected by or through an electronic engine control (EEC) and stored in a buffer or other suitable computer readable medium onboard aircraft 12 prior to transmission to apparatus 10, which may be located onboard an aircraft or, for example, via wireless link, at one or more ground stations.

Portions or all of apparatus(es) 10 may be located within one or more ground stations (not shown) and/or onboard aircraft or other vehicle 12. For example, a data processing unit 16 may comprise an electronic engine control (EEC) system associated with one or more engine(s) 26 or another data processor(s) onboard aircraft 12. A ground station may, for example, include facilities of or otherwise associated with an aircraft system's manufacturer and/or of an airline's owner/operator and/or of a service provider for the particular aircraft system. Accordingly, where apparatus 10 is located within a ground station, system data 18 may be transmitted to apparatus 10 via wireless transmission during or after flight of aircraft 12 using, for example, a data transmission unit (DTU) (not shown) which may be found on aircraft 12.

Alternatively, all and/or any portion(s) of system(s) 10 may be disposed on board an aircraft, or other vehicle, or otherwise co-located with the monitored system(s) 12, 26. For example, in an aircraft application all or a portion of a system 10 may be provided as a part or function of an EEC, and system data 18 may be transmitted, e.g., downloaded, to the same or other apparatus 10 upon landing aircraft 12 by data transmission through a USB port or other connection on aircraft 12 typically provided for interfacing with ground support equipment (GSE) using conventional communication protocols. In another example, in an aircraft application, all or a portion of a system 10 may be provided as a part or function of an EEC, and system data may be provided for cockpit display directly to maintenance crews with no data transmission.

A data processing unit 16 may comprise one or more processors in a common housing (not shown). Alternatively, processors of data processing unit 16 may be remotely located from each other, as for example where a single system 10 is adapted to monitor multiple engines or other systems 12 on a single vehicle. Accordingly, functions performed by a data processing unit 16 may be performed in portions by multiple processors remotely located from each other or on a single processor. Data processing unit 16 may be implemented as a general-purpose processor, microcontroller, controller, microprocessor, host processor, or other suitable processor on-board or remotely located from aircraft 12.

Data 20 representing recommended maintenance schedule(s) may be in electronic form and stored within apparatus 10 on the same or different computer readable medium as system data 18, for example on one or more separate or shared databases 18. Alternatively, data 20 relating to maintenance schedule may be stored remotely from apparatus 10 and made accessible to data processing unit 16 before or during the detection of inadequate maintenance, as for example through wireless remote access.

Notification(s) 22 may be in the form of messages represented by suitably-configured signals provided to interested party(ies) or party system(s) 24. Such notifications may be provided using any suitable data communications techniques, including for example either or both of push and pull technologies. It is to be understood that interested party(ies) 22 may include any one or more party(ies) interested in the monitoring of maintenance procedures performed on a particular aircraft system. For example, interested party 24 may include a pilot of aircraft 12, an airline operator, maintenance personnel, engineering personnel, a service provider and/or a manufacturer of the aircraft system in question. Notification(s) 22 may include indication(s) that inadequate maintenance has or may have been performed and may optionally include instructions detailing a course of action to be carried out in order to at least partially remedy the inadequate maintenance condition. As will be understood by those skilled in the relevant arts, the contents of notification(s) 22 may be determined and/or varied based on factors such as the nature of the system(s) 12 monitored, the nature of operation(s) of such system(s), and the nature of the interested party(ies) 24 to whom notification(s) are to be provided. Accordingly, a notification 22 delivered to, for example, an airline operator may be of a different form and may contain more, less and/or different information than a notification 22 delivered to maintenance personnel. Notifications 22 comprising different content data may be delivered to multiple interested parties 24 upon the detection of inadequate maintenance or other condition(s). Notification(s) 22 may be delivered in the form of an e-mail message, voice-mail or other suitable means of message delivery.

The execution of periodic and preventative maintenance procedures can be crucial to the proper operation of aircraft systems and to the long term health of such systems. The incorrect execution and/or omission of maintenance procedures may cause premature wear, corrosion, and other system problems. Conventional system health monitoring systems and methods may only detect the consequences of inadequate maintenance once a performance degradation or failure can be detected. Hence, by the time any sign can be detected, inadequate maintenance of a system would have already led to consequences that could be costly to remedy.

Some vehicles, including aircraft and especially those used for pleasure in general aviation, are sometimes used only occasionally and systems on such aircraft may be left inactive for extended periods of time. Manufacturers of systems such as gas turbine engines may for example recommend periodically starting, or otherwise turning over or motoring, the engine(s) during periods of inactivity as a step to keep good working order (e.g. engine preservation). For example, engine(s) 26 may be required to be started on a weekly basis during extended periods of inactivity as part of recommended maintenance schedule represented by data set(s) 20. Periodically starting engine(s) 26, may be required to circulate oil in lubrication chambers, agitate fuel in storage containers, and generally counteract the effects, such as corrosion, of the equipment sitting idle. Such actions affect the lifespan and reliability of the system(s) 12, as well as required or prescribed maintenance activity.

Figure 2:
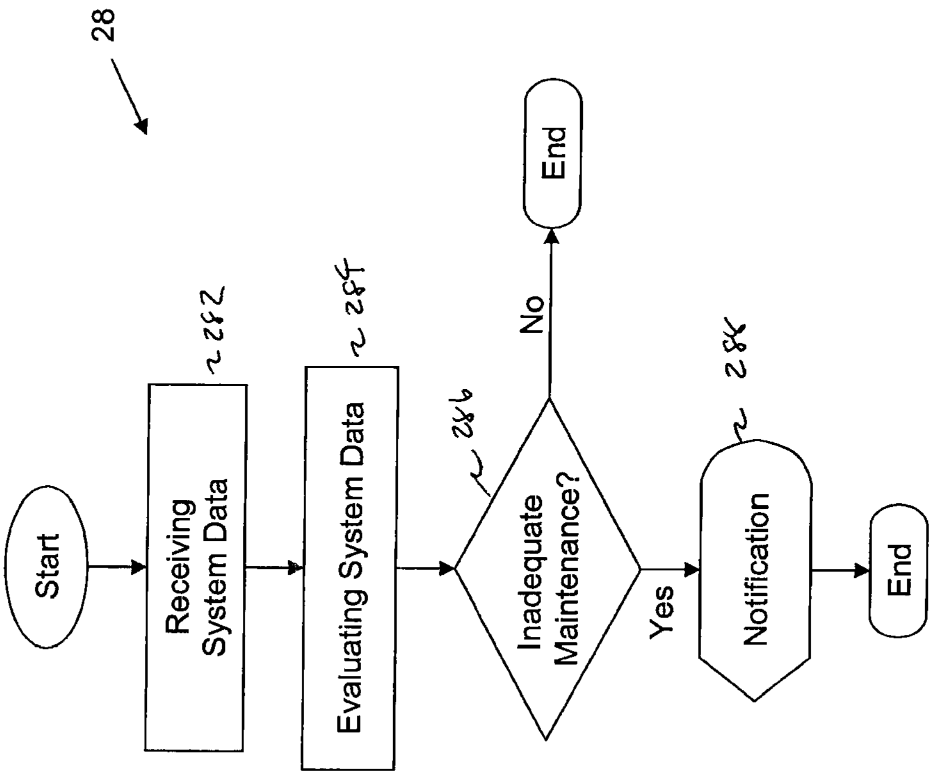
FIG. 2 is a flowchart of a process suitable for use in implementing methods of detecting inadequate maintenance of a system in accordance with the disclosure.

FIG. 2 provides a flowchart of an example of a process 28 suitable for use in implementing methods of detecting inadequate maintenance of a system in accordance with the disclosure herein. Processes or methods 28 may, for example, be implemented using one or more systems 10 such as that shown in FIG. 1. In particular, process(es) 28 may be implemented by one or more processor(s) 16 executing machine-readable instruction sets configured to cause receipt, generation, and other processing of signals representing data as disclosed herein.

Methods 28 may be used to identify incorrect or otherwise deficient maintenance practices performed on aircraft system(s) 12 such as engine(s) 26. Methods 28 may be used to detect inadequate maintenance before degradation of performance or a failure may be detected by conventional health and performance monitoring systems. Methods 28 may be used to detect inadequate maintenance before the occurrence of potentially costly consequences.

In various embodiments, method(s) 28 may comprise: receiving system data 18 (e.g., at 282) and evaluating system data 18 to detect unperformed or otherwise inadequate maintenance of the aircraft system (at 284).

Receipt at 282 of data 18 pertaining to use, non-use, etc., of one or more system(s) 12 may comprise storing system(s)-related data 18 on computer readable media such as one or more electronic databases 14 prior to the evaluation of system data 18 at 284. System data 18 may, for example, be stored in database 14 located physically within an apparatus 10, and/or located remotely from data processing unit 16 and transmitted to data processing unit 16 as required by data processing unit 16.

Evaluation 284 of system data 18 may include, for example, instructing data processing unit(s) 16 to search system-related data 18 and identify one or more events indicative of inadequate maintenance of system(s) 12 of interest. Data processing unit(s) 16 may access data 20 representing recommended maintenance schedule(s) in order to effect comparison(s) between established maintenance schedule(s) and system-related data 18. Identification of an event of inadequate maintenance of a system 12 may, for example, comprise the identification of at least one characteristic of a maintenance procedure defined within system data 18 that is in disagreement with maintenance schedule 20.

An example of application of a process 28 for identifying inadequate maintenance of one or more systems 12 in accordance with the disclosure is the monitoring, by for example an aircraft engine manufacturer, of one or more engine(s) 26, 12 requiring periodic starting during extended periods of inactivity, to determine whether such periodic starting is in fact occurring. Maintenance schedule data 20 may contain data representing recommended value(s) (and/or a value not to exceed) for time interval(s) for periodically starting engine(s) 26 during periods of inactivity. Such time interval value may then be used to search specific parameters within system data 18. For example, zero or very low values of fuel flow, Ng, engine torque and/or ITT within system data 18 may be indicative of inactivity of engine(s) 26. Date and time values within system data 18 may then be used to evaluate the duration of such periods of inactivity and perform a comparison with value(s) from maintenance schedule 20. Upon the detection of a period of inactivity exceeding the value(s) recommended in maintenance schedule 20, notification(s) 22 may be delivered to one or more interested parties 24.

Instead of searching for signs of performance degradation and/or failures within system data 18, data processing unit 16 may search for signs of inadequate maintenance within system data 18 based on recommended maintenance schedule 20. Accordingly, inadequate maintenance may be detected and potentially remedied before the occurrence of costly and/or unfortunate consequences such as performance degradation or system failure(s).

As an example of the application of a process 28 by a system 10 in such circumstances, an EEC communicatively linked to an engine 12, 26 of an aircraft may periodically poll one or more sensors associated with fuel, compressor, turbine, and/or other subsystems 12 of the engine 12, 26, to acquire data representing current values of fuel flow, Ng, engine torque, ITT, and/or other parameters within or otherwise relating to the engine 12, 26. For example, once every 10 seconds, every 30 seconds, or at any other desired or desirable interval, a processor of an ECC may cause signals produced by such sensor(s) to be produced, captured, interpreted, and converted and/or otherwise used to generate corresponding data 18, and stored in buffer(s) or other storage media associated with the EEC. Such media can, for example, include one or more databases 14.

For example, a processor of an EEC may access signal(s) currently being output by an analog/digital signal processor associated with a fuel pump and a corresponding sensor associated with a gas generator, and generate a data record 18 of the form:

<Engine ID><date><time><amb. temp.><fuel flow rate><Ng> where

<Engine ID> is an identifier of the particular engine 12, 26 to which the data record is related <date> is the date on which the data was collected by the EEC <time> is the time of day at which the data was collected by the EEC <amb. temp.> is the ambient temperature of the environment in which the engine 12, 26 is located <fuel flow rate> is the current rate at which fuel is being supplied to the engine 12, 26

<Ng> is the current rotational speed of the gas generator of the engine 12, 26 and store the data record in a nonvolatile, re-writable buffer or data register associated with the EEC.

At 282 in FIG. 2 such data records 18 can be provided to, and/or otherwise accessed and received by one or more systems 10.

At 282 one or more processors associated with the EEC and/or the system 10 (which can indeed, as noted, be a component or subsystem of the EEC, or a stand-alone processing system) can, for each engine or other system 12, continuously or continually compare data records generated for each system 12 to track the use and or non-use of the system 12. For example, if an engine is not running, many of the parameters, such as fuel flow, Ng, etc., will be zero, or substantially zero. Rather than maintaining a data base of zero entries, the first data record recorded in which one or more relevant parameters are zero may be retained, and or downloaded, as needed, to a database 14 of a system 10, and used as the start of an inactive period which is recorded until one or more such parameters vary to non-zero, e.g., operating, levels.

For example, for a given engine 12, 26, such comparisons can be used to generate a set of data records 18 representing engine events such as start times, operating periods, shutdown times, turnover and/or motoring events, and inactive periods. Such a set of data records 18 might, for example, comprise: <Engine ID><start date><start time><event><duration> where

<Engine ID> is an identifier of the particular engine 12, 26 to which the data record is related <date> is the date on which the corresponding event is determined to have started <time> is the time of day at which the corresponding event is determined to have started <event> is an identifier associated with a specific event of interest, e.g., engine start, engine operating period, engine shut down, turnover or motoring, and/or inactive period <duration> is the length of time over which the event is determined to have occurred, and may for example be determined by comparing last shutdown to last start-up or last cold turnover, or dry motoring Alternatively, or in addition, as will be understood by those skilled in the relevant arts, some events may be used to determine other events. For example, consecutive engine shutdown, turnover or motoring, and/or start events, and associated dates and times, can be used to determine the occurrence and duration of engine idle periods.

As an example, an engine (cold) turnover motoring event can be identified by identifying one or more records 18 in which fuel flow, turbine outlet temperature, etc., are zero or close to ambient, but Ng is non-zero. An engine operating period can be identified by a consecutive string of records 18 in which fuel flow, turbine outlet temperature, and Ng are consistent with engine operation.

At 286, system data records 18 can be used to determine whether any indication(s) of inadequate maintenance may be identified. For example, the number, frequency, and/or duration of each of any one or more desired types of events can be compared to the number, frequency, and/or duration with such events are recommended to have been initiated, or to have been allowed to occur, according, for example, to maintenance schedule data 20 stored in database 14 and/or in other media. As will be understood by those skilled in the relevant arts, families or sets of schedules, which are contingent on various conditions and/or parameters, may be provided. For example, engine cold turnover or motoring procedures may be required more frequently in cold conditions than in warm ambient temperatures.

Recommended maintenance schedule data 20 may comprise data representing a variety of maintenance procedures that may be detectable through analysis of system data 18. For example, procedures such as desalination washes, performance recovery washes and compressor turbine washes, in addition to cold-turnover or motoring procedures, may periodically need to be conducted on engine(s) 26. Details of such procedures may be included in maintenance schedule 20. As will be understood by those skilled in the relevant arts, and as described above, such periodic maintenance procedures may leave a unique signature of Ng, ITT and time in system data sets 18.

For example, a desalination wash of engine(s) 26 may include: (1) a motoring run (starter operating, with no fuel flow and no ignition) for 30 seconds; (2) an engine shutdown; (3) a 30-second wait to allow the starter to cool; and (4) an engine start and run up to 80% Ng for one minute. A performance recovery wash may include: (1) a motoring run for 30 seconds; (2) an engine shutdown; (3) a 15 to 30 minute wait for a wash fluid to act; (4) one to two motoring runs to introduce rinse fluid; (5) an engine shutdown; (6) a 30-second wait to allow the starter to cool; (7) an engine start and run up to 80% Ng for one minute; and (8) an engine shutdown. A compressor turbine wash may include: (1) a motoring run for 30 seconds to introduce wash fluid; (2) an engine shutdown; (3) repeat of washing cycles as necessary; and (4) an engine start and run at idle for one minute or more.

Each of the above washes may leave a unique signature of Ng, ITT and time within system data 18 and allow for performance of such procedures to be detected within system data 18. Data processing unit 16 may be instructed to search through system data 18 for events or at least one characteristic representative of a specific maintenance procedure that is defined in maintenance schedule 20. Accordingly, data processing unit 16 may be configured to identify the performance of a specific maintenance procedure and whether it was performed according to the maintenance schedule 20. Data processing unit 16 may be configured via appropriate software instructions to detect if a particular maintenance procedure was attempted, conducted correctly and/or if any step of the procedure was omitted.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines.

What is claimed is:

1. A method for detecting an inadequate past maintenance procedure performed in the past on an aircraft system, the method performed by a data processing system and comprising:

using sensor signals generated by one or more sensors associated with at least one system of an aircraft to generate system data from the sensor signals, the system data representing one or more operating parameters associated with an operation of the at least one aircraft system during the execution of a past maintenance procedure requiring operation of the at least one aircraft system;

accessing reference data representing the past maintenance procedure requiring operation of the at least one aircraft system;

using a comparison of the generated system data with the accessed reference data to detect a signature in the system data corresponding to the execution of the past maintenance procedure requiring operation of the at least one aircraft system;

determining from the comparison that the execution of the past maintenance procedure was inadequate;

generating one or more warning signals indicative of the inadequate past maintenance procedure; and storing the one or more warning signals indicative of the inadequate past maintenance procedure in non-transitory computer-readable memory.

2. The method of claim 1, wherein the warning signals represent at least one instruction associated with corrective maintenance.

3. The method of claim 1, wherein the past maintenance procedure is selected from the group consisting of: a desalination wash of a gas turbine engine; a performance recovery wash of a gas turbine engine; and a compressor turbine wash of a gas turbine engine.

4. The method of claim 1, wherein the past maintenance procedure comprises starting a gas turbine engine during a period of inactivity.

5. The method of claim 1, wherein the past maintenance procedure comprises turning over a gas turbine engine during a period of inactivity.

6. The method of claim 1, wherein the past maintenance procedure comprises dry motoring a gas turbine engine during a period of inactivity.

7. A non-transitory medium or media comprising machine-readable instructions executable by a data processor, the machine-readable instructions, when executed, causing the processor to:

use sensor signals generated by one or more sensors associated with at least one system of an aircraft to generate system data from the sensor signals, the system data representing one or more operating parameters associated with an operation of the at least one aircraft system during the execution of a past maintenance procedure requiring operation of the at least one aircraft system;

access reference data representing the past maintenance procedure requiring operation of the at least one aircraft system;

based at least partly on a comparison of the generated system data with the accessed reference data, detect a signature in the system data corresponding to the execution of the past maintenance procedure requiring operation of the at least one aircraft system;

determine from the comparison that the execution of the past maintenance procedure was inadequate;

generate one or more warning signals indicative of the inadequate past maintenance procedure; and store the one or more warning signals indicative of the inadequate past maintenance procedure in non-transitory computer-readable memory.

8. The medium or media of claim 7, wherein the warning signals represent at least one instruction associated with corrective maintenance.

9. The medium or media of claim 7, wherein the past maintenance procedure is selected from the group consisting of: a desalination wash of a gas turbine engine; a performance recovery wash of a gas turbine engine; and a compressor turbine wash of a gas turbine engine.

10. The medium or media of claim 7, wherein the past maintenance procedure comprises starting a gas turbine engine during a period of inactivity.

11. The medium or media of claim 7, wherein the past maintenance procedure comprises turning over a gas turbine engine during a period of inactivity.

12. The medium or media of claim 7, wherein the past maintenance procedure comprises dry motoring a gas turbine engine during a period of inactivity.

13. A system for detecting an inadequate past maintenance procedure performed on an aircraft system, the system comprising at least one data processor configured to execute machine-readable instructions which, when executed, cause the at least one processor to:

use sensor signals generated by one or more sensors associated with at least one system of an aircraft to generate system data from the sensor signals, the system data representing one or more operating parameters associated with an operation of the at least one aircraft system during the execution of a past maintenance procedure requiring operation of the at least one aircraft system;

access reference data representing the past maintenance procedure requiring operation of the at least one aircraft system;

detect a signature in the system data corresponding to the execution of the past maintenance procedure requiring operation of the at least one aircraft system based at least partly on a comparison of the generated system data with the accessed reference data;

determine from the comparison that the execution of the past maintenance procedure was inadequate;

generate one or more warning signals indicative of the inadequate past maintenance procedure; and store the one or more warning signals indicative of the inadequate past maintenance procedure in non-transitory computer-readable memory.

14. The system of claim 13, wherein the warning signals represent at least one instruction associated with corrective maintenance.

15. The system of claim 13, wherein the past maintenance procedure is selected from the group consisting of: a desalination wash of a gas turbine engine; a performance recovery wash of a gas turbine engine; and a compressor turbine wash of a gas turbine engine.

16. The system of claim 13, wherein the past maintenance procedure comprises starting a gas turbine engine during a period of inactivity.

17. The system of claim 13, wherein the past maintenance procedure comprises turning over a gas turbine engine during a period of inactivity.

18. The system of claim 13, wherein the past maintenance procedure comprises dry motoring a gas turbine engine during a period of inactivity.

* * * * *